United States Patent [19]

Keesling et al.

[11] Patent Number: 4,632,348
[45] Date of Patent: Dec. 30, 1986

[54] MOUNTING ARRANGEMENT FOR A MIRROR

[75] Inventors: William A. Keesling, Middletown; William J. Metzger, Anderson, both of Ind.

[73] Assignee: General Motors Corporation, Detroit, Mich.

[21] Appl. No.: 808,276

[22] Filed: Dec. 12, 1985

[51] Int. Cl.⁴ .............................................. A47B 96/06
[52] U.S. Cl. .................................. 248/222.1; 248/481
[58] Field of Search ............... 248/222.1, 223.4, 224.1, 248/224.2, 225.1, 73, 549, 475.1, 469, 481; 24/665

[56] References Cited

U.S. PATENT DOCUMENTS

| | | |
|---|---|---|
| 2,129,189 | 9/1938 | Alder . |
| 2,577,526 | 12/1951 | Kelly . |
| 2,771,263 | 11/1956 | Boho ............................ 248/223.4 X |
| 3,211,409 | 10/1965 | Zimmermann . |
| 3,237,898 | 3/1966 | Goss . |
| 3,367,616 | 2/1968 | Bausch et al. . |
| 3,512,746 | 5/1970 | Vitaloni et al. ............. 248/222.1 X |
| 3,589,662 | 6/1971 | LaGrange . |
| 3,631,572 | 1/1972 | Lange . |
| 3,928,894 | 12/1975 | Bury et al. ................... 248/223.4 X |
| 4,254,931 | 3/1981 | Aikens . |
| 4,283,038 | 8/1981 | Kurtz . |
| 4,346,868 | 8/1982 | Lindner ....................... 248/223.4 X |

Primary Examiner—J. Franklin Foss
Attorney, Agent, or Firm—Edward J. Biskup

[57] ABSTRACT

A two piece mounting arrangement for a vehicle inside rear view mirror that employs a spring clip having a body integrally formed with at least two bow-shaped spring fingers and a resilient lock bar which prevents one part of the mounting arrangement from being removed from the other part without first depressing the lock bar.

3 Claims, 5 Drawing Figures

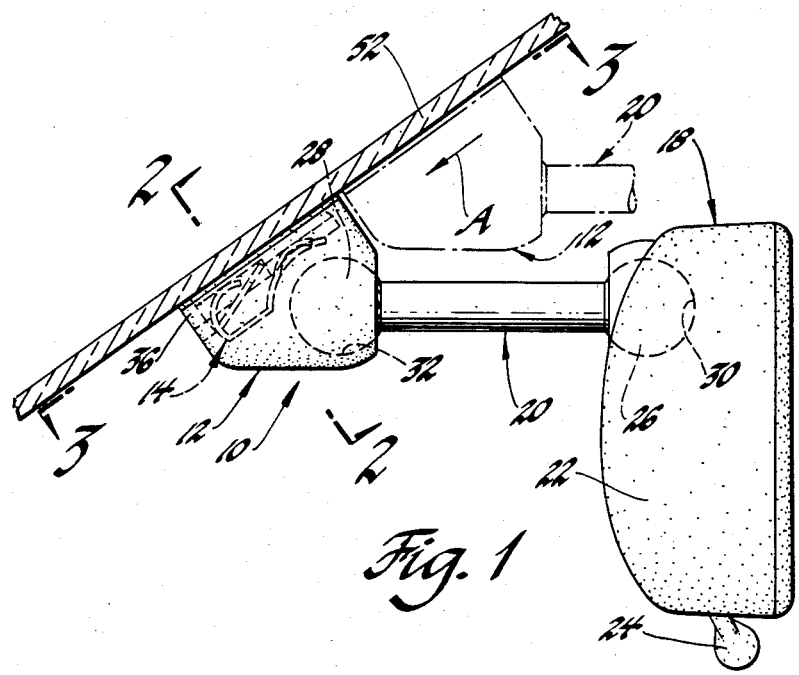

MOUNTING ARRANGEMENT FOR A MIRROR

This invention in general relates to supports and more particularly concerns a mounting arrangement which serves to removably attach a rear view mirror to the windshield of an automobile.

More specifically, the mounting arrangement according to the present invention includes a mirror support combined with a base adhesively bonded to the windshield for adjustably carrying a rear view mirror. The mirror support and the base have the side edges thereof respectively formed with cooperating tongues and grooves which allow the mirror support to be placed in mating engagement with the base. The mirror support has a cavity formed in one side thereof so when combined with the base a pocket is provided that is accessible from the bottom end of the mirror support. A spring clip is located in the pocket and includes a lock bar which engages a shoulder on the base for retaining the mirror support on the base. The lock bar is adapted to be moved out of engagement with the shoulder to allow the removal of the mirror support from the base. This can be accomplished by inserting a thin blade type tool into the pocket area of the mirror support so as to depress the lock bar and remove it from engagement with the shoulder on the base.

The objects of the present invention are to provide a new and improved mounting arrangement for a vehicle inside rear view mirror that has a mirror support connected by a spring clip to a base secured to the vehicle windshield; to provide a new and improved mounting arrangement for a vehicle inside rear view mirror that includes a mirror support and a base combined with a spring clip having a lock bar which is accessible through an opening in the mirror support to allow a tool to depress the lock bar and permit the mirror support to be removed from the base; to provide a new and improved two piece mounting arrangement for a vehicle inside rear view mirror that employs a spring clip member having a body section integrally formed with at least a pair of bow-shaped spring arms and a T-shaped locking bar that prevents one part of the mounting arrangement from being removed from the other part without first depressing the lock bar; and to provide a new and improved two piece mounting arrangement for a vehicle inside rear view mirror characterized in that a mirror support is removably connected to a base which is adhesively bonded to the windshield and includes a spring clip member having a body that is integrally formed with two sets of bow-shaped spring arms and a T-shaped lock bar which together serve to normally lock the two parts of the mounting arrangement together but can be released by use of a simple tool.

Other objects and advantages of the present invention will be apparent from a reading of the following detailed description when taken with the drawings in which:

FIG. 1 is a side elevational view of a mounting arrangement according to the present invention connecting an inside rear view mirror to the windshield of an automobile;

FIG. 2 is an enlarged sectional view of the mounting arrangement taken on line 2—2 of FIG. 1;

FIG. 3 is a view taken on line 3—3 of FIG. 1 showing the base member of the mounting arrangement;

FIG. 4 is a sectional view taken on line 4—4 of FIG. 2; and

FIG. 5 is a perspective view of the spring clip member incorporated in the mounting arrangement shown in FIGS. 1-4.

Referring now to the drawings and more particularly FIGS. 1 and 2 thereof, a mounting arrangement 10 made in accordance with the present invention is shown comprising a mirror support member 12, a spring clip 14 and a base member 16 which cooperate for purposes of supporting an inside rear view mirror assembly 18 through a support shaft 20.

The mirror assembly 18 is of a conventional type having a housing 22, the front end of which supports a prismoidal mirror (not shown) having a pair of reflecting surfaces of different reflecting power that can be selectively presented to the driver. Thus, by movement of an actuator 24, the housing 22 and accordingly the mirror is selectively pivoted between two viewing positions, namely, a "day" position which is used under conditions of normal visibility and a "night" position which is used to provide a rearward image of reduced intensity to reduce the headlight glare from a following vehicle.

As alluded to above, the mirror assembly 18 is carried by the mounting arrangement 10 through the support shaft 20 and, in this connection, it will be noted that the support shaft 20 has a spherical ball 26 formed at one end and a spherical ball 28 formed at the other end. The spherical ball 26 is located in a spherical socket 30 formed in the rear wall of the housing 22 of the mirror assembly 18. A spherical socket 32 is also formed in the mirror support member 12 and serves to receive the spherical ball 28. Thus, the ball and socket connections at the opposite ends of the support shaft 20 allow the mirror assembly 18 to be pivotably located in various positions to accommodate the rearward viewing needs of drivers of different height.

As to the mounting arrangement and more particularly the mirror support member 12, it will be noted that the latter, as seen in FIG. 4, is made from a plastic material and is formed with a cavity 34 located opposite the socket 32. As best seen in FIG. 2, the cavity 34 defines a pair of laterally spaced parallel depending legs 36 and 38 along the side edges of the mirror support 12 and a wall 40 extending transversely of the legs 36 and 38 as seen in FIGS. 3 and 4. The legs 36 and 38 are formed with a pair of parallel grooves 42 and 44 respectively, which allow the mirror support member 12 support to be attached to the base member 16 in a manner to be described hereinafter.

The base member 16 is generally rectangular in configuration and has the opposite side edges thereof formed with outwardly projecting parallel tongues 46 and 48 that extend the length of the base member 16 as seen in FIG. 3. The rear surface of the base member 16 is bonded through a suitable adhesive 50 to the inside surface of a windshield 52. The front surface of the base member 16 is formed with a stepped shoulder 54 which extends transversely to the longitudinal axis of the base member 16.

The spring clip 14 is made of spring steel and is adapted to be located within the cavity 34 of the mirror support 12 as seen in FIG. 4. More specifically, the spring clip 14 has a body portion which includes a flat floor section 56 that at one end is integral with a pair of upwardly extending and laterally spaced bow-shaped spring arms 58 and 60. A curved retainer section 62 is located between the spring arms 58 and 60 and together with the floor section 56 conforms to and is maintained within the bottom of the cavity 34 between shoulders 64 and 66. The other end of the floor section 56 of the spring clip 14 is also integrally connected to a pair of laterally spaced bow-shaped spring arms 68 and 70 between which is provided a T-shaped lock bar 72 that is integral at its lower end with the floor section 56.

From the above description, it should be apparent that the spring clip 14 is normally located within the cavity 34 of the mirror support member 12 and the latter is connected to and supports the mirror assembly 18 through the support shaft 20. Thus, when connecting the mirror assembly 18 to the base member 16, the mirror support member 12 is first located in the phantom line position of FIG. 1 with the grooves 42 and 44 of the mirror support member 12 in axial alignment with the tongues 46 and 48 of the base member 16. The mirror support member 12 is then moved in the direction of the arrow A so as to cause the mating engagement of the two members. The downward movement of the mirror support member 12 is continued until the wall 40 thereof engages the top edge of the base member 16 at which time the lock bar 72 clears the shoulder 54 and assumes the raised lock position seen in FIG. 4. At this time the four spring arms 58, 60, 68 and 70 serve to apply a biasing force against the base member 16 to provide a firm and rigid connection between the base member 16 and the mirror support member 12 so as to prevent any relative movement between the two which might be occasioned by vibrations generated by the automobile while moving along a road.

Accordingly, as seen in FIG. 1-4, the mirror support member 12 is locked to the base member 16 and firmly held thereon. If it should be desired to remove the mirror support member 12 from the base member 16, this can be accomplished by inserting a narrow blade-like tool into the lower open end of the cavity 34 and depressing the lock bar 72 to the phantom line position seen in FIG. 4 out of engagement with the shoulder 54 and simultaneously moving the mirror support member 12 in an upward direction. Once the lock bar 72 clears the shoulder 54, the mirror support member 12 can be removed from the base member 16 by continued upward movement of the mirror support member 12.

Various changes and modifications can be made in this construction without departing from the spirit of the invention. Such changes and modifications are contemplated by the inventors and they do not wish to be limited except by the scope of the appended claims.

The embodiments of the invention for which an exclusive property or privilege is claimed are defined as follows:

1. A mounting arrangement for connecting a mirror assembly to an automobile windshield, said mounting arrangement comprising a mirror support member, a base member adapted to be adhesively bonded to said automobile windshield and having a shoulder formed thereon, said mirror support member and said base member each having a top edge and a pair of side edges, each of the side edges of said base and said mirror support having cooperating tongue and groove portions whereby said mirror support member can be placed into mating engagement with said base member until the top portions of the base member and mirror support member contact each other and provide a stop, said mirror support member having a cavity formed therein so when combined with said base member a pocket is provided which is accessible from the bottom end of said mirror support member, a spring clip located in said cavity for preventing said mirror support member from being removed from said base member, said spring clip having a body retained by said cavity in said mirror support member, a pair of bow-shaped spring arms integral with said body and serving to apply a biasing force against said base member, and a T-shaped lock bar integral with said body and normally engaging said shoulder on said base member to prevent movement of said mirror support member in an upward direction and being movable out of engagement with said shoulder by a tool inserted into said pocket so as to allow said mirror support member to be removed from said base member.

2. A mounting arrangement for connecting a mirror assembly to an automobile windshield, said mounting arrangement comprising a mirror support member, a base member adapted to be adhesively bonded to an automobile windshield and having a shoulder formed thereon, said mirror support member having a pair of parallel depending legs integral with a transversely extending wall, said base member having a pair of side edges and a top edge, each of the side edges of said base member and said legs of said mirror support member having cooperating tongue and groove portions whereby said mirror support member can be moved in a downward direction into mating engagement with said base member until the top edge of the base member and the wall of said mirror support member contact each other and provide a stop, said mirror support member having a cavity defined by said legs and said wall so when combined with said base member a pocket is provided which is accessible from the bottom end of said mirror support member, a spring clip located in said cavity for preventing said mirror support member from being removed from said base member, said spring clip having a body retained by said cavity in said mirror support member, a pair of laterally spaced bow-shaped spring arms integral with said body and serving to apply a biasing force against said base member, and a T-shaped lock bar integral with said body and located between said pair of spring arms, said lock bar normally engaging said shoulder on said base member to prevent movement of said mirror support member in an upward direction and being movable out of engagement with said shoulder by a tool inserted into said pocket so as to allow said mirror support to be removed from said base.

3. A mounting arrangement for connecting a mirror assembly to an automobile windshield, said mounting assembly comprising a mirror support member, a base member adapted to be adhesively bonded to an automobile windshield and having a transversely extending stepped shoulder formed thereon, said mirror support member and said base member each having a top edge and a pair of side edges, each of the side edges of said base member and said mirror support member having cooperating tongue and groove portions whereby said mirror support member can be moved in a downward direction into mating engagement with said base member until the top portions of the base member and mirror support member contact each other and provide a stop, said mirror support member having a cavity formed therein so when combined with said base member a pocket is provided which is accessible from the bottom end of said mirror support member, a spring clip located in said cavity for preventing said mirror support member from being removed from said base member, said spring clip having a body which includes a flat floor section and a curved retainer section secured within said cavity of said mirror support member, a first pair of laterally spaced bow-shaped spring arms integral with one end of said body and located on opposite sides of said retainer section, a second pair of laterally spaced bow-shaped spring arms integral with the other end of said body and serving together with said first pair of spring arms to apply a biasing force against said base member, and a T-shaped lock bar integral with said other end of said body and located between said second pair of spring arms, said lock bar normally engaging said shoulder on said base member to prevent movement of said mirror support member in an upward direction and being depressible out of engagement with said shoulder by a tool inserted into said pocket so as to allow said mirror support member to be removed from said base member.

* * * * *